(12) United States Patent
Al Amour

(10) Patent No.: US 11,365,973 B2
(45) Date of Patent: Jun. 21, 2022

(54) DRONE-BASED SCANNING FOR LOCATION-BASED SERVICES

(71) Applicant: HEWLETT PACKARD ENTERPRISE DEVELOPMENT LP, Houston, TX (US)

(72) Inventor: Motasem Al Amour, Hesse (DE)

(73) Assignee: Hewlett Packard Enterprise Development LP, Houston, TX (US)

(*) Notice: Subject to any disclaimer, the term of this patent is extended or adjusted under 35 U.S.C. 154(b) by 289 days.

(21) Appl. No.: 16/255,547

(22) Filed: Jan. 23, 2019

(65) Prior Publication Data

US 2020/0232797 A1 Jul. 23, 2020

(51) Int. Cl.
*G05D 1/10* (2006.01)
*G01C 21/20* (2006.01)
(Continued)

(52) U.S. Cl.
CPC .......... *G01C 21/206* (2013.01); *B64C 39/024* (2013.01); *G05D 1/0246* (2013.01); *G05D 1/10* (2013.01); *G05D 1/101* (2013.01); *G06Q 50/28* (2013.01); *G06V 20/10* (2022.01); *B64C 2201/128* (2013.01); *B64C 2201/141* (2013.01); *G05D 2201/0216* (2013.01)

(58) Field of Classification Search
CPC .. G06Q 10/08; G06Q 10/087; G06Q 10/0875; G05D 1/0088; G05D 1/0246; G05D 1/10; G05D 1/101; G06K 7/10821; B64C 2201/141; B64C 2201/143; B64C 2201/145; B64C 39/024; B64C 2201/128; G01C 21/206

USPC .......................................................... 701/3, 25
See application file for complete search history.

(56) References Cited

U.S. PATENT DOCUMENTS 9,359,074 B2 * 6/2016 Ganesh ................ G05D 1/0022
9,592,964 B2   3/2017 Gollu
(Continued)

FOREIGN PATENT DOCUMENTS

WO WO-2018035482 2/2018

OTHER PUBLICATIONS

2D Barcode Detection using Images for Drone-assisted Inventory Management; Hyeon Cho;Dongyi Kim;Junho Park;Kyungshik Roh;Wonjun Hwang; 2018 15th International Conference on Ubiquitous Robots (UR);Year: 2018; IEEE Conference Paper. (Year: 2018).*

(Continued)

*Primary Examiner* — Cuong H Nguyen
(74) *Attorney, Agent, or Firm* — McDermott Will & Emery

(57) ABSTRACT

Systems and methods are provided for drone-based scanning of products in a retail space, for providing location-based services at the retail space. A system may include a drone aircraft or other self-navigating vehicle. The drone or vehicle automatically moves along the shelves of the retail space, after business hours, scanning product identifiers, and feeds product location information to a location-based-services server. The location-based services server may then provide a map of the retail space with product locations on the map that is accessible to a user's mobile device when the user is in the retail space. In this way, users can be guided directly to the current locations of potentially thousands of products that dynamically change locations.

20 Claims, 7 Drawing Sheets

(51) Int. Cl.
    *G06Q 50/28*     (2012.01)
    *B64C 39/02*     (2006.01)
    *G05D 1/02*     (2020.01)
    *G06V 20/10*     (2022.01)

(56) References Cited

U.S. PATENT DOCUMENTS

| | | | | |
|---|---|---|---|---|
| 9,961,507 | B1* | 5/2018 | Mendelson | H04W 48/10 |
| 9,999,213 | B2* | 6/2018 | Yu | A01M 1/223 |
| 10,378,906 | B2* | 8/2019 | O'Brien | G06Q 10/08 |
| 10,762,926 | B2* | 9/2020 | Goodman | B25J 9/1664 |
| 2016/0068264 | A1* | 3/2016 | Ganesh | B64C 39/024 701/2 |
| 2016/0247116 | A1* | 8/2016 | Olivo | G06Q 10/087 |
| 2017/0034700 | A1* | 2/2017 | Cohen | H04L 9/321 |
| 2017/0225336 | A1* | 8/2017 | Deyle | B25J 5/007 |
| 2018/0077918 | A1* | 3/2018 | Yu | B64C 39/024 |
| 2018/0094935 | A1* | 4/2018 | O'Brien | B64C 39/024 |
| 2018/0101817 | A1* | 4/2018 | Lection | B64D 45/08 |
| 2018/0144642 | A1* | 5/2018 | High | H04W 4/80 |
| 2018/0204470 | A1 | 7/2018 | Rezvani et al. | |
| 2019/0102730 | A1* | 4/2019 | Giorgi | B64D 1/22 |
| 2019/0259419 | A1* | 8/2019 | Goodman | G11B 15/6885 |
| 2019/0377345 | A1* | 12/2019 | Bachrach | G06V 20/17 |
| 2020/0050206 | A1* | 2/2020 | Deyle | G01S 13/881 |
| 2020/0053325 | A1* | 2/2020 | Deyle | G05D 1/0088 |
| 2020/0061839 | A1* | 2/2020 | Deyle | G06Q 10/087 |
| 2020/0302510 | A1* | 9/2020 | Chachek | G06K 9/6289 |
| 2020/0348662 | A1* | 11/2020 | Cella | H04W 52/246 |

OTHER PUBLICATIONS

WareVision: CNN Barcode Detection-Based UAV Trajectory Optimization for Autonomous Warehouse Stocktaking; Ivan Kalinov et al.; IEEE Robotics and Automation Letters; Year: 2020; vol. 5, Issue: 4; IEEE Journal Article. (Year: 2020).*

UAV stocktaking task-planning for industrial warehouses based on improved hybrid differential evolution algorithm; Haishi Liu; Qiyong Chen;Nan Pan;Yuxuan Sun;Yuqiang An;Dilin Pan; IEEE Transactions on Industrial Informatics; Year: 2021; IEEE Early Access Article (Year: 2021).*

Design of drone fleet management model in a production system of customized products; Felisa Cordova;Victor Olivares; 2016 6th International Conference on Computers Communications and Control (ICCCC); Year: 2016; IEEE Conference Paper. (Year: 2016).*

Z. Zhao, J. Fang, G. Q. Huang and M. Zhang, "iBeacon enabled indoor positioning for warehouse management," 2016 4th International Symposium on Computational and Business Intelligence (ISCBI), 2016, pp. 21-26, doi: 10.1109/ISCBI.2016.7743254.*

Rekleitis, I., Dudek, G. & Milios, E. Multi-robot collaboration for robust exploration. Annals of Mathematics and Artificial Intelligence 31, 7-40 (2001). https://doi.org/10.1023/A:1016636024246; (Year: 2001).*

B. Rahmadya, R. Sun, S. Takeda, K. Kagoshima and M. Umehira, "A Framework to Determine Secure Distances for Either Drones or Robots Based Inventory Management Systems," in IEEE Access, vol. 8, pp. 170153-170161, 2020, doi: 10.1109/ACCESS.2020.3024963 (Year: 2020).*

"Improving the Efficiency of the Warehouse Storage Process With the Use of Drones" by Tatjana Sibalija of Metropolitan University, May 2019 (Year: 2019).*

Guinand F., Guérin F., Petitprez E. UAV-UGV Multi-robot System for Warehouse Inventory: Scheduling Issues. In: Nguyen N.T., Iliadis L., Maglogiannis I., Trawiński B. (eds) Computational Collective Intelligence. ICCCI 2021. vol 12876. Springer, Cham. https://doi.org/10.1007 (Year: 2021).*

Rhiat A., Chalal L., Saadane A. A Smart Warehouse Using Robots and Drone to Optimize Inventory Management. In: Arai K. Proceedings of the Future Technologies Conference (FTC) 2021, vol. 1. FTC 2021. Lecture Notes in Networks and Systems, vol. 358. Springer, Cham. https://doi.org/10.1007/978-3-030-899 (Year: 2022).*

Stock Take, Physical Inventory, Cycle Counting, (Web Page), Retrieved Nov. 29, 2018, 8 Pgs.

* cited by examiner

DRONE-BASED SCANNING FOR LOCATION-BASED SERVICES

BACKGROUND

Background

Retail locations often use location-based services to provide customer service such as to a user at the retail location. For example, when a user carries their smart phone into a store, wireless beacons at the store can communicate with the user's smart phone to detect the presence of the smart phone, and can then provide the user with the ability to check in at the store using their smart phone. These location-based services can also be used to obtain data about the user for the store. For example, the beacons can be used to track the user's location and movement within the store.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same reference numerals are associated with the same or similar elements and steps, unless indicated otherwise.

DETAILED DESCRIPTION

Figure 1:
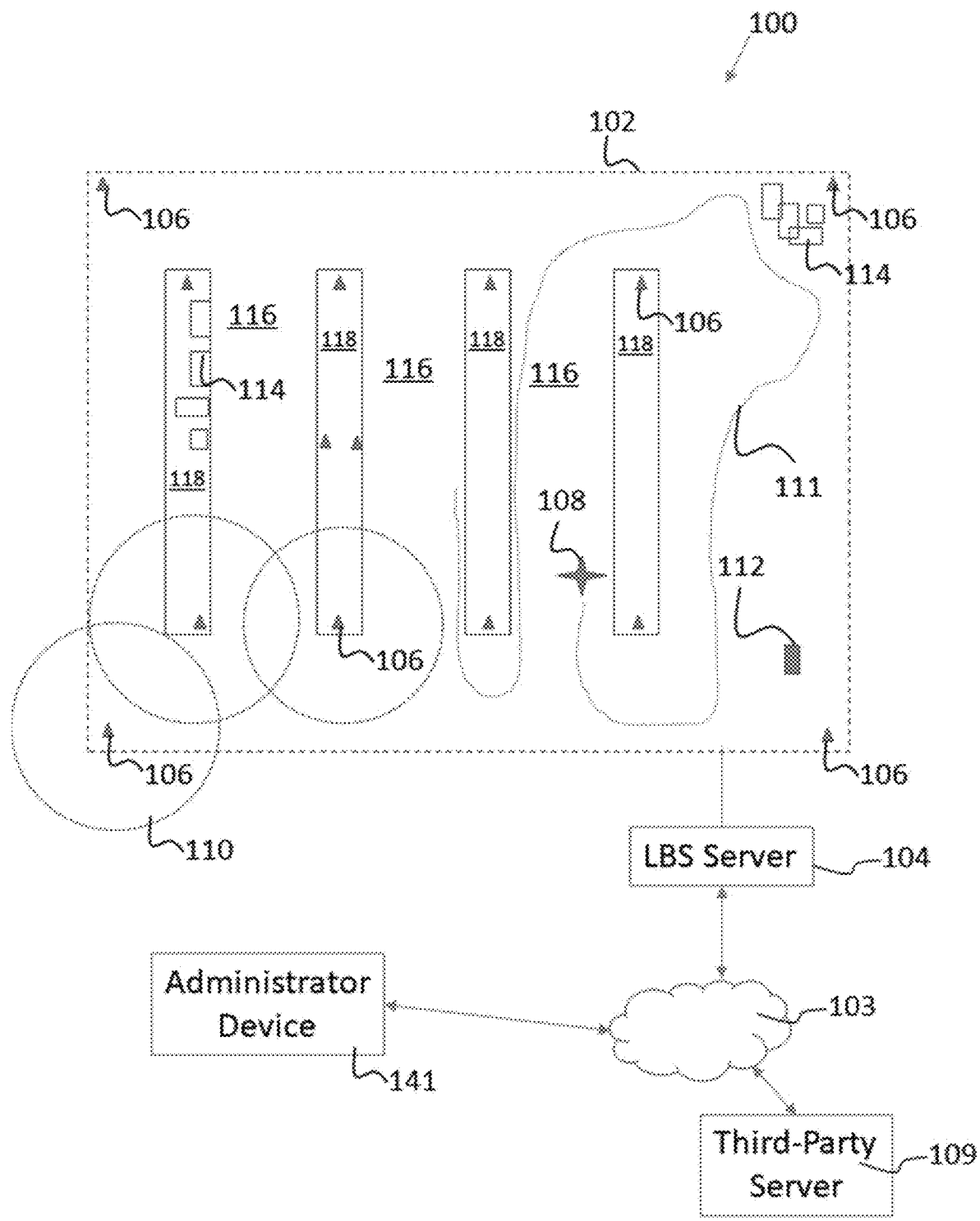
FIG. 1 illustrates an example architecture suitable for drone-based scanning systems and methods for location-based services, according to aspects of the disclosure.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

The present disclosure provides an improvement to the technology of location-based services. In particular, it has been discovered during the implementation of location-based services systems at various retail locations, that the dynamic nature of product placement within the retail locations can make it difficult or impossible to use the location-based services system to provide services specific to the actual current locations of various products. This can be particularly problematic at big-box retailers in which thousands of products are stocked on and around shelves that can span acres of retail space. Beyond the sheer scale of these retail locations, the fact that the products are constantly moving due to customer purchases, shelf restocking, seasonal and/or promotional displays, and the like has previously prevented implementation of product-specific location-based services such as providing navigation for a user to a particular product in a store.

The systems and methods disclosed herein provide a technical solution to the technical problem of maintaining a product location database that accurately corresponds to the dynamically changing physical locations of products in a retail location. More specifically, the systems and methods herein provide a self-navigating mobile computing device, which can be implemented as a vehicle such as a drone or a rover (e.g., a self-driving ground-based vehicle), that includes both scanning capabilities for identifying products, and communications circuitry for determining its own location via communication with the wireless beacons that provide the location-based services. Various examples are described herein in which a drone is described. However, it should be appreciated that this is merely illustrative and other self-navigating mobile computing devices can be used.

Each product in a retail location has a label, a name, a picture, or an identifiable appearance that can be recognized by a scanner such as a bar code scanner or a camera on a drone. Because the drone is also provided with beacon communications circuitry with which the drone's location (e.g., a two or three-dimensional location relative to a known map of the retail location) can be determined (e.g., by the drone itself or another computing device), a recognized product that is scanned by the drone can be linked to the location of the drone, thereby obtaining the location of the product within the retail location.

The drone may fly (or otherwise self-propel) along a navigation path within the retail location and, as the drone is flying through the retail location, its camera(s) will collect product identifiers and corresponding locations. The cameras may collect the product identifiers by, for example, scanning bar codes or by capturing images of the products and, via image processing, extracting a product image or text such as a name or a description from the captured images to identify the products.

A location-based services (LBS) server that is accessible by a user device at the retail location can then access the product locations identified with the drone and provided to the server. The user device can then display one or more of the product locations (e.g., locations of products searched on the user device and/or suggested products for the user) on a map displayed on the user's smart phone. Because the beacons at the retail location can also be used to track the user's position within the retail location, the LBS server and/or an application running on the user's device can provide navigation for the user to the location of a particular product.

In order to ensure that the correct locations of the products in the dynamically changing environment of the retail location are accurate at all times, the drone can be programmed to self-navigate through the retail location (e.g., during closing hours) using a (locally stored or remotely accessed)

map of the retail location and/or using one or more navigation cameras and/or sensors to update the products and their positions. In this way, the system can account for changes in product locations due to customer purchases, restocking, replacing, or any other changes made by the store employees or customers.

In this way, location-based services are improved by the added ability to guide customers to particular products by assigning a position to each product using systems and methods that are automated and scalable, and require no human intervention (although administrative access can be provided to control the motion and operations of a drone, if desired). Moreover, a history of the products and their positions can be recorded by the drone and/or the LBS server, facilitating data analytics to couple user position/dwell time or other user activities with products and/or other features of the retail location.

In accordance with various aspects of the disclosure, a computer-implemented method is described that includes autonomously moving a vehicle through a retail space having products at three-dimensional product locations along a navigation route at a particular speed. The method also includes scanning, by the vehicle, each of the products with at least one scanner on the vehicle while the vehicle is at a three-dimensional vehicle location such that the three-dimensional product location for that product is within a scanning range at a scan time for that product. The method also includes determining, by the vehicle, at least a two-dimensional product location associated with each scanned product based on the three-dimensional vehicle location at the scan time for that product. The method also includes storing, by the vehicle, a mapping between at least the two-dimensional product location for at least one of the products and information for the corresponding product.

In accordance with other aspects of the disclosure, a system is provided that includes a plurality of beacons located within a retail space, a self-navigating mobile computing device having a scanner and configured to autonomously move within the retail space while exchanging wireless communications with various ones of the beacons, and operate the scanner to scan product identifiers of products at various corresponding product locations within the retail space, and a server storing a map of the retail space. The server is configured to store, for each of the products, the product identifier scanned by the scanner and a location identifier for the corresponding product location. The location identifier for each product is based on the wireless communications between the self-navigating mobile computing device and at least one of the beacons.

In accordance with other aspects of the disclosure, a non-transitory, machine-readable medium is described that includes instructions, which when executed by one or more processors, cause a computer to perform a method, the method including operating propulsion components of a self-navigating mobile device to move the self-navigating mobile device to each of several locations within a retail space; while the self-navigating mobile device is in at least some of the several locations within the retail space, operate a scanner of the self-navigating mobile device to scan product identifiers associated with the at least some of the several locations; and transmitting location information for the at least some of the several locations, and product information associated with each scanned product identifier, to a location-based services server.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1 illustrates an example architecture in which a drone-based scanning system for location-based services can be implemented, according to some embodiments. In the example of FIG. 1, a location-based services system 100 is shown for a retail space 102 that is implemented as a brick-and-mortal store having aisles 116 separated by shelves 118. In the depicted example, products 114 are located on shelves 118 and elsewhere within the boundaries of the retail space 102. For example, a promotional display of products 114 is illustrated in the top-right corner of the depiction of the retail location.

The location-based services system 100 that is implemented for retail space 102 includes a location-based services (LBS) server 104 in communication with wireless beacons 106 (sometimes referred to herein simply as beacons) that are distributed throughout the retail space 102. LBS server 104 can be located at the retail location, or remotely from retail space 102 and communicatively coupled to beacons 106, user device 112, and/or drone 108 (or other vehicle or self-navigating mobile computing device via a network 103 such as a local area network or the Internet. One or more administrator devices such as administrator device 141 may also be communicatively coupled to LBS server 104 and/or drone 108 and may be provided with the ability to set, update, change, or otherwise manage the operation (e.g., the navigation path) of drone 108. User device 112, beacons 106, LBS server 104, and/or drone 108 may also communicate with other computing devices such as third-party server 109 via network 103.

Beacons 106 are distributed within retail space 102 such that the overlapping coverage areas 110, and the known locations of the beacons 106, can be used to triangulate the location of other devices in communication with the beacons, such as a user device 112 or a drone 108. Beacons 106 may be arranged to have overlapping coverage areas that allow two or three-dimensional locations of user devices 112 and/or drone 108. For example, beacons 106 for three-dimensional positioning may be vertically distributed (e.g., on or within shelves 118) as well as horizontally distributed within retail space 102.

Beacons 106 may include wireless communications circuitry such as Bluetooth Low Energy (BLE) circuitry, wireless local area network (LAN) circuitry (e.g., WiFi' circuitry), cellular communications circuitry, global positioning system (GPS) circuitry, other radio or microwave communications circuitry, and/or infrared communications circuitry.

Drone 108 may be a self-navigating vehicle such as a self-navigating rover and/or a self-navigating drone aircraft that includes wheels, propellers, or other propulsion devices that are operable to move the device within retail space 102, such as along a navigation path such as navigation route 111 at a particular speed). Drone 108, which is sometimes referred to herein as a vehicle or a self-navigating mobile computing device in various illustrative examples, also includes one or more scanners and/or one or more cameras and is programmed to autonomously move within the retail space 102 while exchanging wireless communications with various ones of the beacons 106 to determine the location of drone 108 for determining product locations and for navigation of the drone. Drone 108 may be integrated with the location-based services system 100 or may be a separate drone-based scanning system that provides product location data to LBS system 100 (e.g., via an application programming interface (API) provided by the LBS system) to store and/or update product positions.

Navigation route 111 may be predetermined based on a known map of retail space 102 (e.g., to cover the entire retail space while making a fewest number of overlapping trips), may be adjusted in real time from a predetermined path based on images captured by drone 108 (e.g., to avoid obstacles and/or scan products in new, changed, or unexpected locations such as in a new promotional display), and/or determined entirely in real time (e.g., by performing a 360 degree initial scan of the drone's surroundings, then identifying areas that have been restocked or otherwise changed based on the initial scan, and navigating toward that targeted direction for an update/refresh scan).

Drone 108 may move along navigation route 111 at a speed that is determined by the drone (e.g., based on a product density in a particular portion of retail space 102 as determined using images of that portion of the retail space captured by the drone). For example, drone 108 may move quickly through a portion of retail space 102 in which large items (e.g., refrigerators, washing machines, cars, tires, televisions, or the like) are displayed and more slowly through another portion of the retail space in which small items (e.g., toothpaste, trinkets, fresh fruits, canned food, jewelry, or the like) are displayed. In this way, the speed of the drone can be determined to ensure the ability of the drone to scan all products in the retail space without expending excess time and energy moving slowly in regions in which little or no scanning is taking place.

LBS server 104 may store, for each of the products 114 in retail space 102, a product identifier and a location identifier (e.g., a two or three-dimensional location identifier) for the corresponding product location. When a user device 112 is in communication with LBS server 104, the product identifiers and their respective locations can be provided to the user device (e.g., along with a map of the retail space). If the user device 112 is also in communication with beacons 106, user device 112 and/or LBS server 104 can provide navigation for the user that can be displayed by user device 112 as step-by-step text and/or graphical directions to a particular product.

Figure 2:
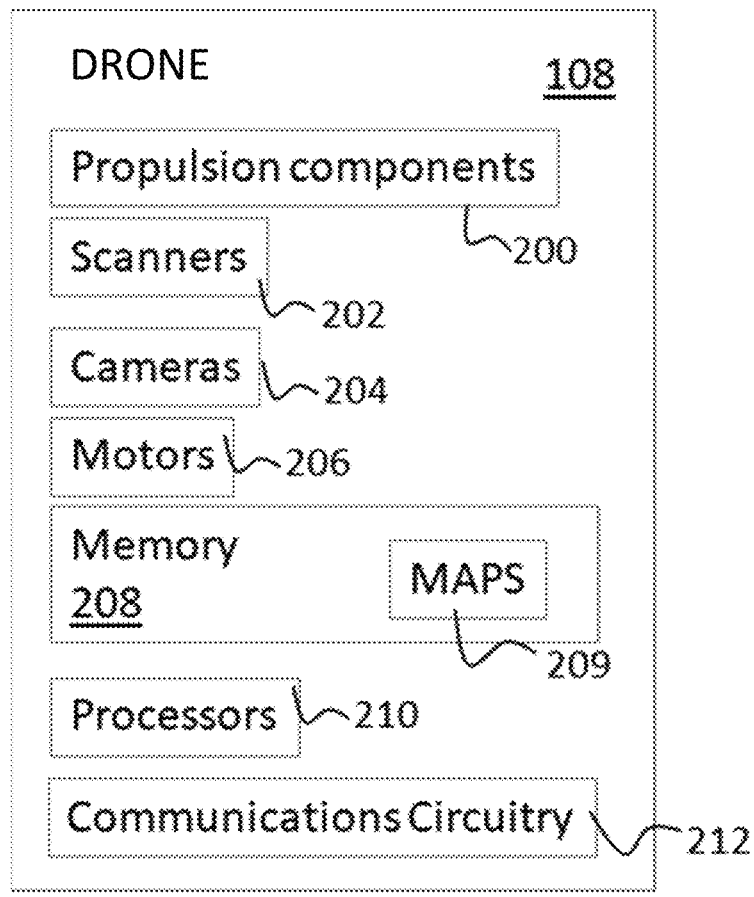
FIG. 2 is a block diagram illustrating components of an example self-navigating mobile computing device from the architecture of FIG. 1, according to aspects of the disclosure.

FIG. 2 is a block diagram showing a drone 108 implemented as a vehicle such as a drone aircraft or a rover. The block diagram of FIG. 2 shows how a vehicle for automated scanning of product locations may include propulsion components 200 such as wheels for a rover or propellers for a drone aircraft, one or more scanners 202 for product scanning, one or more cameras 204 for navigation and/or product scanning, one or more motors 206 or engines for operating propulsion components 200, and computing components for product identification, location determination, and communications with beacons 106 and/or LBS server 104.

As shown, the computing components may include a memory 208, one or more processors 210, and communication circuitry 212 such as Bluetooth Low Energy (BLE) circuitry, wireless local area network (LAN) circuitry (e.g., wireless local area network (WLAN) circuitry), cellular communications circuitry, global positioning system (GPS) circuitry, other radio or microwave communications circuitry, and/or infrared communications circuitry. Memory 208 may store instructions that, when executed by processors 210 cause drone 108 to perform one or more of the navigation, communication, scanning, imaging, or other operations described herein.

As shown, memory 208 may also store one or more maps 209 of retail space 102. Maps 209 may be stored at drone 108 or may be accessed remotely from LBS server 104 using communications circuitry 212. Drone 108 may navigate through retail space 102 by continuously determining its location using communications with beacons 106 in combination with maps 209, and/or using cameras 204 to detect obstacles and capture images for navigation and/or product identification. In the example of FIG. 2, components 202, 204, 208, 210, and 212 are integrated components of vehicle 108. However, in some scenarios, components 202, 204, 208, 210, and 212 can be implemented in a separate device that is mechanically attached to drone 108.

Figure 3:
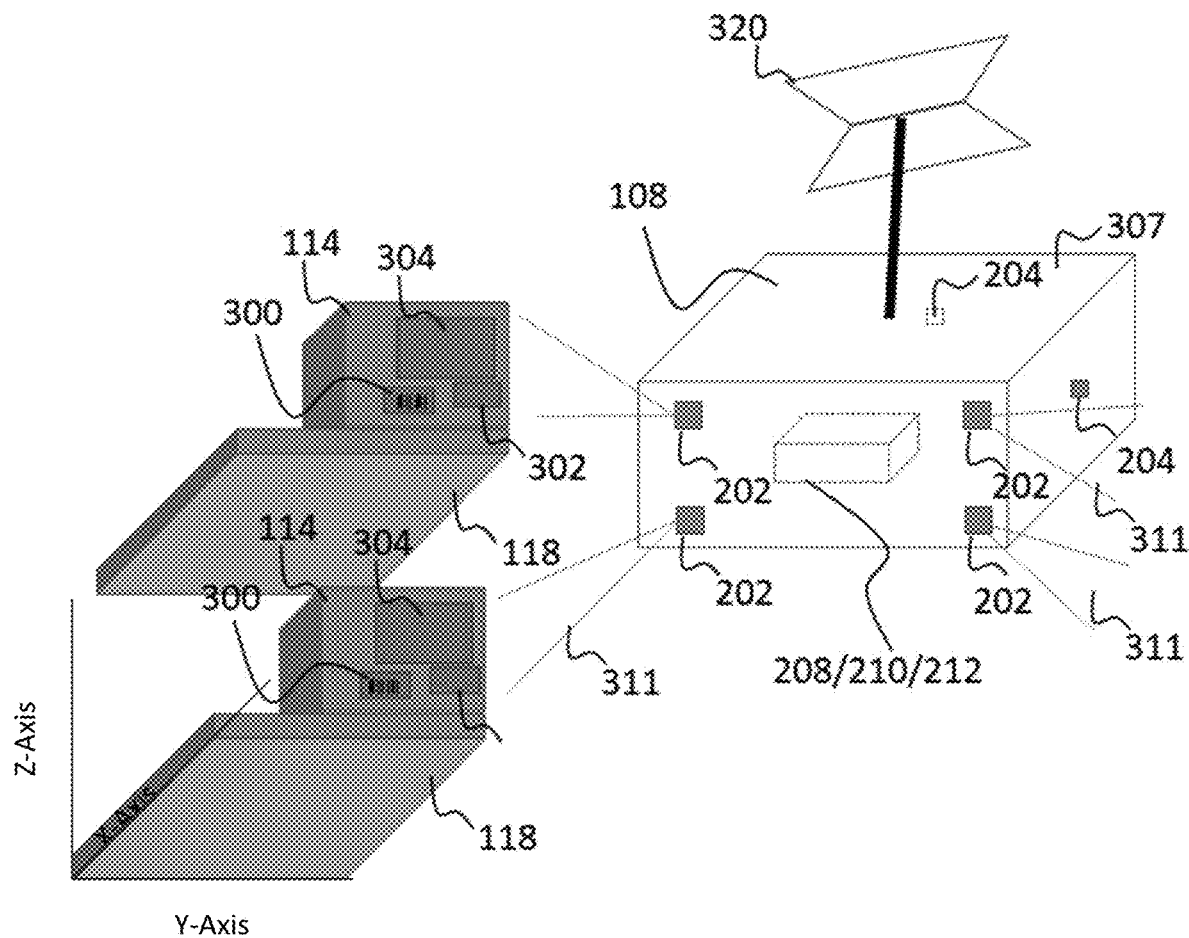
FIG. 3 illustrates a self-navigating mobile computing device, implemented as a drone and performing product scans, according to aspects of the disclosure.

FIG. 3 is a schematic diagram illustrating a drone 108, implemented as a drone aircraft, scanning products 114 on shelves 118. In the example of FIG. 3, drone 108 includes a propeller 320 (e.g., an implementation of propulsion components 200 of FIG. 2) that allows drone 108 to hover above the ground at various three-dimensional vehicle locations, and to move throughout retail space 102 along a navigation route at a particular speed. In this example, drone 108 includes at least four scanners 202, including two each on two opposing sides of a drone housing 307, and computing components 208/210/212 within the housing. Although other arrangements for scanners 202 are possible (e.g., one, two, three, four, or more than four cameras on one, two, three, four, or more than four surfaces of the drone housing), this example allows the drone to simultaneously scan products at two heights on each of two sides of the drone. In this way, drone 108 can be configured to scan products 114 on two vertically stacked shelves 118 on two different sides of the drone to reduce or minimize the number of passes down an aisle 116 needed to scan all products in that aisle. In other arrangements, the drone may make several passes down a particular aisle at several heights to scan all products in that aisle.

Scanners 202 may be bar code scanners, RFID scanners, or other scanners that scan coded identifiers of products 114 such as bar codes 300, RFID chips, or the like. Scanners 202 may also, or alternatively, include cameras such as visible-light cameras or infrared cameras that capture images of products 114. In implementations in which scanners 202 include cameras, products 114 may be identified by capturing an image of the product, and extracting a product name 302 or a product image 304, or an identifiable shape or other feature of the product from the captured image.

In the example depicted in FIG. 3, drone 108 has arrived at a particular location along a navigation route along which the drone is autonomously moving through a retail space at a particular speed. As illustrated, products 114 are distributed in various three-dimensional product locations (e.g., an x-y location and a z-height for each product), and drone 108 is scanning the products 114 with scanners 202 while the drone is at a three-dimensional vehicle location (e.g., an x-y location and a z-height for the drone) such that the three-dimensional product locations for several products are within a scanning range 311 (e.g., a field of view of a camera and/or a maximum scanning distance) of at least one of scanners 202 at a scan time for that product.

Based on the obtained scans of products 114 and the known three-dimensional vehicle location at the time of each scan, drone 108 and/or LBS server 104 determines at least a two-dimensional product location associated with each scanned product 114 (e.g., based on the three-dimensional vehicle location at the scan time for that product). Drone 108 and/or LBS server 104 then store a mapping between at least the two-dimensional product location for at least one of the products 114 and information such as a coded identifier, a product name, and/or a product image for the corresponding product.

After scanning the products 114 within the scanning range(s) 311 of scanners 202 at a particular vehicle location (e.g., while the drone is stationary or continuing to move), drone 108 may then continue to automatically move along the navigation route along the shelves 118 and other portions of the retail location scanning product identifiers, and feeding product location information to LBS server 104. As shown, one or more navigation cameras 204 can also be provided on one or more sides of drone housing 307 to capture images with which the drone can avoid obstacles or otherwise enhance navigation. A location-based services map, including the scanned product locations, may then be made accessible to a user's mobile device 112 when the user is in the retail space 102. This solves a practical problem with implementing location-based services (such as providing an in-store map to a product, presented on the user's phone) in a large retail environment with thousands of products that dynamically change locations.

Figure 4:
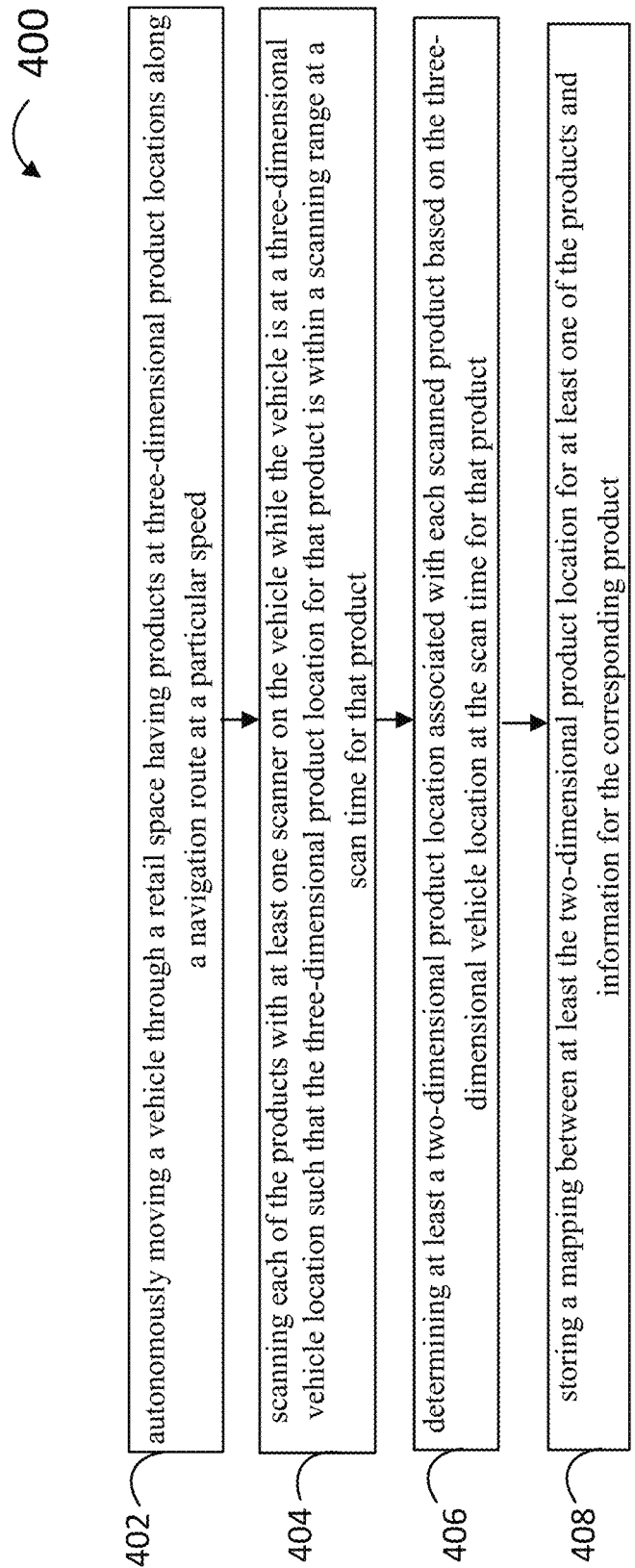
FIG. 4 is a flow chart illustrating operations that may be performed for drone-based scanning for location-based services, according to aspects of the disclosure.

FIG. 4 is a flow chart illustrating operations 400 that can be performed for drone-based scanning for location-based services, according to aspects of the disclosure. Operations 400 may be performed, for example, by drone 108 and/or LBS server 104 of FIG. 1. At least some of the operations 400 may be performed by a computer having a processor executing commands stored in a memory of the computer. Methods consistent with the present disclosure may include at least some, but not all, of the operations 400, performed in a different sequence. Furthermore, methods consistent with the present disclosure may include two or more of operations 400 performed overlapping in time, or almost simultaneously.

At block 402, a self-navigating mobile computing device such as drone 108 autonomously moves through a retail space (e.g., retail space 102) having products (e.g., products 114) at three-dimensional product locations along a navigation route (e.g., navigation route 111) at a particular speed. As described in further detail hereinafter in connection with FIG. 5, the navigation route may be predetermined based on a map of the retail space (e.g., as input by an administrator, and/or as determined by the drone or an administrator device as a path to scan the entire retail space with minimal overlapping portions of the route), and/or generated or modified by the vehicle based on a scan of the vehicle's surroundings (e.g., based on images of the retail space captured by the drone). As described in further detail hereinafter in connection with FIG. 6, the particular speed may be determined based on a product size and/or a product density, to ensure all products are scanned with minimal wasted drone operation time and/or energy.

At block 404, each of the products 114 is scanned with at least one scanner on the vehicle while the vehicle is at a three-dimensional vehicle location such that the three-dimensional product location for that product is within a scanning range at a scan time for that product.

At block 406, at least a two-dimensional product location associated with each scanned product is determined (e.g., by the drone and/or by LBS server 104 upon receipt of location and product identification information form the drone) based on the three-dimensional vehicle location at the scan time for that product.

At block 408, a mapping between at least the two-dimensional product location for at least one of the products and information for the corresponding product is stored (e.g., at the drone and/or at LBS server 104). The stored mapping can then be used to provide a map of the retail space 102 with product locations and identifiers to a user device such as user device 112.

The mapping may be determined by determining a product location for each product and by obtaining an identifier of that product for storage in connection with the product location. Obtaining the product identifier may include scanning a coded identifier of the product with the scanner(s) on the vehicle and/or retrieving product information by extracting text from a product cover or the product itself and identifying a subset of the extracted text to be the product name or descriptor.

Retrieving product information by extracting a product name and/or descriptor from an image of the product obtained using a camera of the vehicle may include (i) performing image processing operations to recognize a product label (e.g., by recognizing a known color, size, and/or shape of the label used at a particular retail space), extracting text inside the recognized label, and comparing the extracted text with a product database at LBS server 104. The product may be identified as the product with an exact match or with a best fit within a match certainty range (e.g., above 90%). If no match is found between the extracted text and the product database, a notification message may be sent to an administrator device, as this can be a sign of wrong labelling of a product. The text may also be extracted from images of packaging of the product or the product itself.

When a product is scanned with the drone at a particular vehicle location, the product identifier and associated product location can be stored if the product location is new, updated if the product location has changed, or discarded if the product location is already known (e.g., to within a tolerance range).

Figure 5:
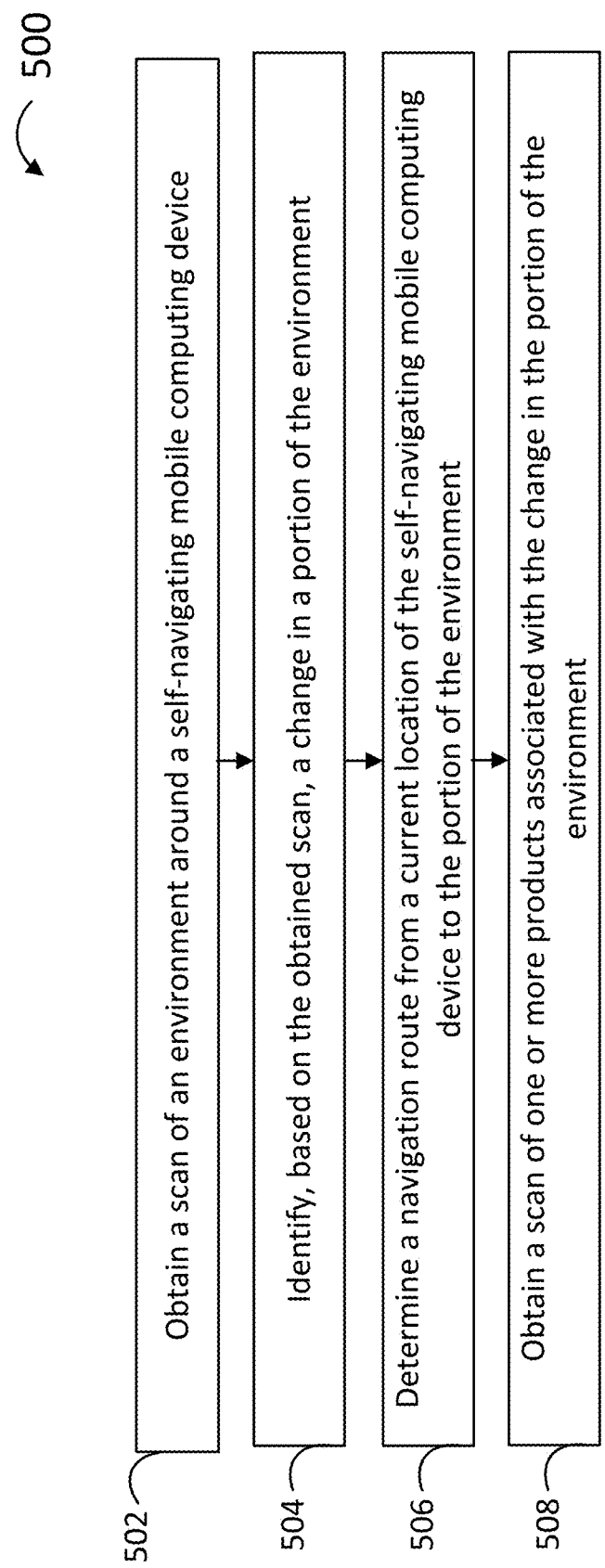
FIG. 5 is a flow chart illustrating operations that may be performed determining navigation routes for drone-based scanning for location-based services, according to aspects of the disclosure.

FIG. 5 is a flow chart illustrating operations 500 that can be performed for determining a navigation route for an update scan for drone-based scanning for location-based services, according to aspects of the disclosure. Update scans may be performed periodically (e.g., once each day or responsive to an update command from an administrator device) after an initial scan of all products in the entirety of retail space 102. The initial scan may be performed by moving the drone along an initial navigation route that is administrator generated or that is automatically determined by the drone and/or server 104 based on a map of the retail space and routing conditions that cause the route to be optimized to reduce overlapping route portions. Operations 500 may be performed, for example, by drone 108 and/or LBS server 104 of FIG. 1. At least some of the operations 500 may be performed by a computer having a processor executing commands stored in a memory of the computer. Methods consistent with the present disclosure may include at least some, but not all, of the operations 500, performed in a different sequence. Furthermore, methods consistent with the present disclosure may include two or more of operations 500 performed overlapping in time, or almost simultaneously.

At block 502, a scan of an environment around a self-navigating mobile computing device such as drone 108 is obtained. Scanning the environment may include flying the drone to a height at which all or a large portion of a retail space can be viewed, and capturing images (e.g., a mosaic covering a 360 degree view around the drone) of the visible portion of the retail space.

At block 504, a change in a portion of the environment may be identified based on the obtained scan. For example, the captured image mosaic may be compared with another image mosaic captured at an earlier time (e.g., on the previous day). A change between the captured image mosaic and the earlier-captured image mosaic can be used to identify a change in the environment (e.g., due to customer removal of products, restocking of shelves, and/or addition or removal of a promotional or seasonal display of products).

At block 506, a navigation route is determined (e.g., by the drone or by LBS server 104) from a current location of the self-navigating mobile computing device to the portion of the environment in which the change is identified.

At block 508, a scan of one or more products associated with the change in the portion of the environment is obtained. For example, if the change is associated with new products being added at the retail location, a new mapping between the location of the new products and product information for the products can be stored.

Figure 6:
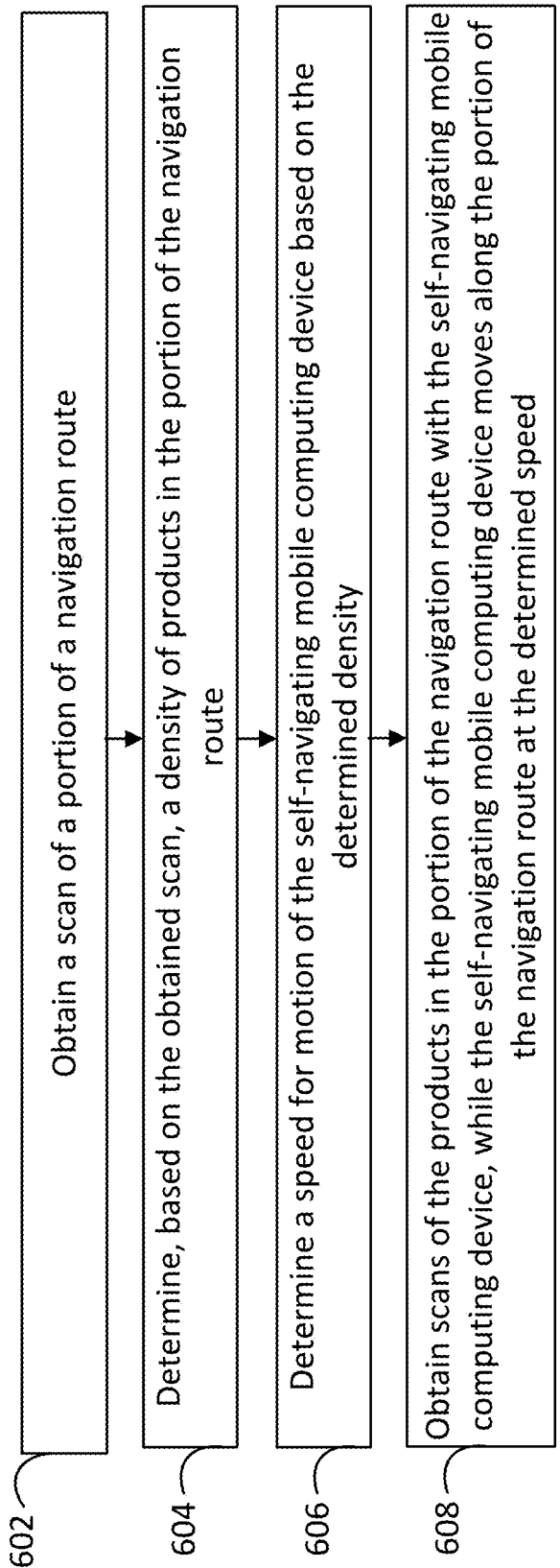
FIG. 6 is a flow chart illustrating operations that may be performed determining drone speeds for drone-based scanning for location-based services, according to aspects of the disclosure.

FIG. 6 is a flow chart illustrating operations 600 that can be performed for determining a speed for a drone along a navigation route for drone-based scanning for location-based services, according to aspects of the disclosure. Operations 600 may be performed, for example, by drone 108 and/or LBS server 104 of FIG. 1. At least some of the operations 600 may be performed by a computer having a processor executing commands stored in a memory of the computer. Methods consistent with the present disclosure may include at least some, but not all, of the operations 600, performed in a different sequence. Furthermore, methods consistent with the present disclosure may include two or more of operations 600 performed overlapping in time, or almost simultaneously.

At block 602, a scan of a portion of a navigation route for a self-navigating mobile computing device, such as drone 108, is obtained. Scanning the portion of the navigation route may include capturing images of the portion of the navigation route using one or more cameras on drone 108.

At block 604, drone 108 and/or LBS server 104 may determine, based on the obtained scan, a density of products 114 in the portion of the navigation route. For example, closely stacked small products may have a relatively high density, while sparsely stacked large objects may have a relatively low density. Determining the density may include identifying products in the captured images and, using a known field of view of the cameras and a number of the identified products, computing the product density.

At block 606, the speed of motion for the self-navigating mobile computing device is determined based on the determined density. For example, for a high product density portion of the navigation route, the speed of motion may be relatively low to allow time to scan all of the products in the portion of the retail space as the drone moves along the navigation route. For a lower product density portion of the navigation route, the speed of motion may be relatively higher.

At block 608, scans of the products in the portion of the navigation route are obtained (e.g., as described above in connection with FIGS. 3 and 4) with the self-navigating mobile computing device, while the self-navigating mobile computing device moves along the portion of the navigation route at the determined speed.

Hardware Overview

Figure 7:
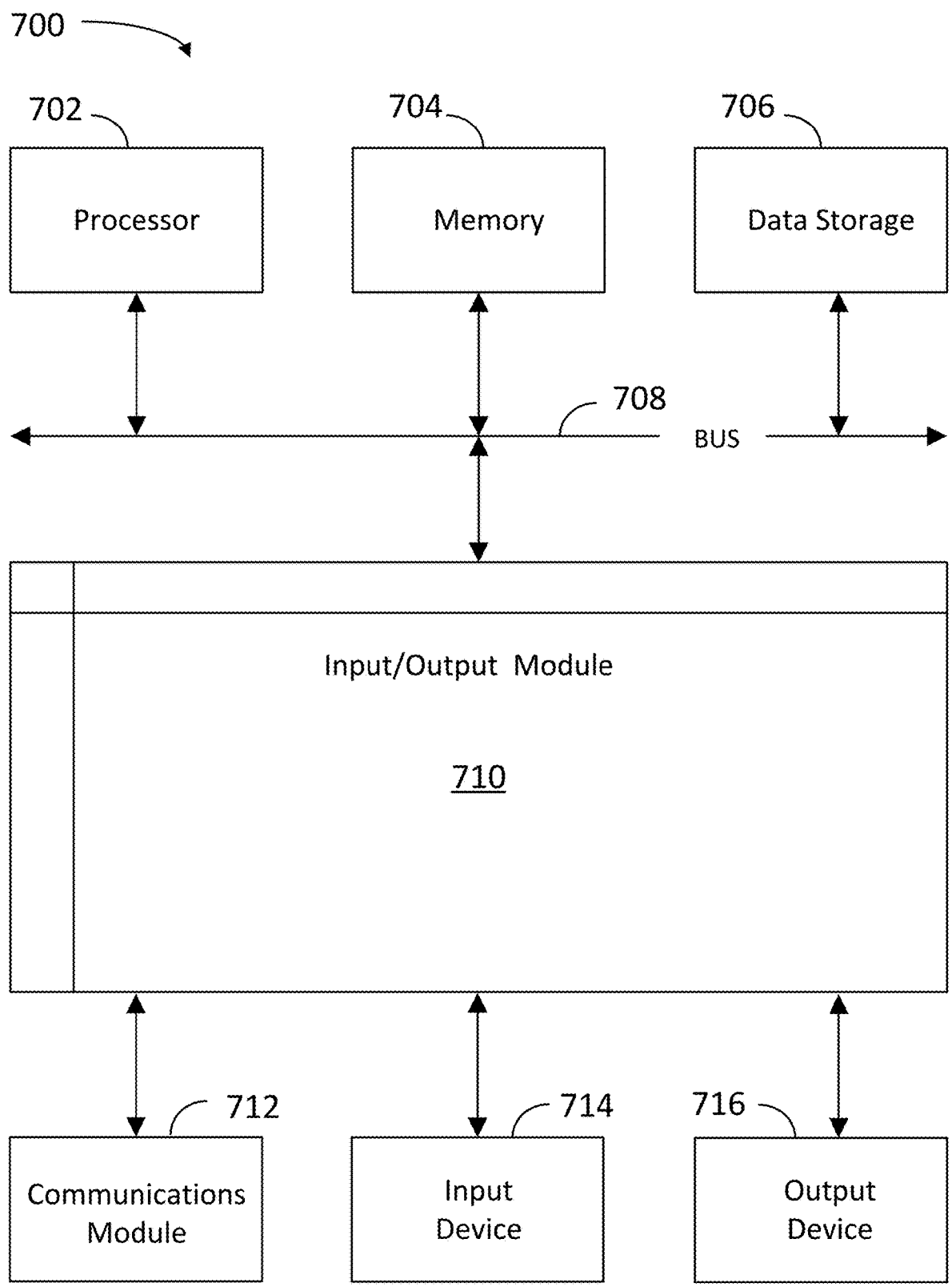
FIG. 7 is a block diagram illustrating an example computer system with which the self-navigating mobile computing device and/or the server(s) of FIGS. 1, 2, and 3, and the methods of FIGS. 4, 5, and 6 can be implemented.

FIG. 7 is a block diagram illustrating an exemplary computer system 700 with which the drone 108, LBS server 104, user device 112, third-party server 109, and/or administrator device 141 of FIGS. 1 and 2, and the operations of FIGS. 4, 5, and 6, can be implemented. In certain aspects, the computer system 700 may be implemented using hardware or a combination of software and hardware, either in a dedicated network device, or integrated into another entity, or distributed across multiple entities.

Computer system 700 (e.g., drone 108, LBS server 104, user device 112, third-party server 109, and/or administrator device 141) includes a bus 708 or other communication mechanism for communicating information, and a processor 702 (e.g., processors 210) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 208), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, e.g., one or more modules of computer program instructions encoded on a computer-readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage 706 such as a magnetic disk or optical disk, coupled to bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communications modules 712 (e.g., communications circuitry 212) include networking interface cards, such as Ethernet cards and modems. In certain aspects, input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 716 include display devices, such as an LCD (liquid crystal display) monitor, for displaying information to the user.

According to one aspect of the present disclosure, the drone 108 and/or server 104 can be implemented using a computer system 700 in response to processor 702 executing one or more sequences of one or more instructions contained in memory 704. Such instructions may be read into memory 704 from another machine-readable medium, such as data storage 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data network device, or that includes a middleware component, e.g., an application network device, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 103) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and network devices. A client and network device are generally remote from each other and typically interact through a communication network. The relationship of client and network device arises by virtue of computer programs running on the respective computers and having a client-network device relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage 706. Volatile media include dynamic memory, such as memory 704. Transmission media include coaxial cables, copper wire, and fiber optics, including the wires forming bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   during a first scan of a retail space having products at three-dimensional product locations, autonomously moving a vehicle through the retail space along a navigation route, wherein:
   each respective product of the products is scanned with at least one scanner on the vehicle while the vehicle is at a three-dimensional vehicle location such that the respective product is within a scanning range of the at least one scanner at a scan time for the respective product,
   at least a two-dimensional product location associated with the respective product is determined based on the three-dimensional vehicle location of the vehicle at the scan time for the respective product, and
   a mapping between at least the two-dimensional product location for the respective product and information for the respective product is stored;
   scanning an environment of the retail space to identify a change in a portion of the environment, the portion of the environment after the change comprising products that are different from the portion of the environment prior to the change; and
   in response to identifying the change in the portion of the environment, performing an update scan of the retail space by routing the vehicle to the portion of the environment, scanning the products in the portion of the environment after the change, and updating the mapping based on the update scan.

2. The computer-implemented method of claim 1, further comprising obtaining the information for the respective product based on the scanned respective product.

3. The computer-implemented method of claim 2, wherein the information includes a product name, a coded identifier, an image, or a price for the respective product.

4. The computer-implemented method of claim 3, wherein each scanned respective product is associated with a captured image, and wherein obtaining the information for each respective product comprises extracting text from the captured image of the respective product.

5. The computer-implemented method of claim 1, further comprising receiving, while autonomously moving the vehicle, an update to the navigation route from an administrator device.

6. The computer-implemented method of claim 1, further comprising performing an initial scan of an environment around the vehicle; and
   determining the navigation route based on the initial scan.

7. The computer-implemented method of claim 6, further comprising:
   determining a route between a current location of the vehicle and a location of the portion of the environment with the identified change.

8. The computer-implemented method of claim 7, wherein the identified change is associated with a restock, a replacement, or a customer purchase of one or more of the products.

9. The computer-implemented method of claim 1, further comprising determining a speed of the vehicle along the navigation route based on a density of the products.

10. The computer-implemented method of claim 9, further comprising:
    capturing an image of a portion of the navigation route; and
    determining the density of the products based on the captured image.

11. The computer-implemented method of claim 1, wherein the vehicle is a self-driving ground-based vehicle or a drone aircraft.

12. The computer-implemented method of claim 1, wherein the navigation route is arranged to allow the at least one scanner on the vehicle to scan all areas of the retail space with minimum overlapping paths along the navigation route.

13. The computer-implemented method of claim 1, further comprising determining the three-dimensional vehicle location based on communications between the vehicle and a plurality of wireless beacons in the retail space.

14. The computer-implemented method of claim 13, further comprising providing, to a smart phone, at least the two-dimensional product location for at least one of the products.

15. The computer-implemented method of claim 14, further comprising:
    determining a location of the smart phone by triangulating the location of the smart phone based on a plurality of beacons in the retail space; and
    providing directions from the determined location of the smart phone to the two-dimensional product location.

16. A system comprising:
    a processor; and
    a non-transitory storage medium storing instructions executable on the processor to:
        determine a first density of products in a first portion of a retail space;
        determine a second density of products in a second portion of the retail space, wherein the second density is different from the first density;
        based on the first density, set a first speed of a self-navigating mobile computing device having a scanner to scan the products in the first portion of the retail space;
        based on the second density, set a second speed of the self-navigating mobile computing device to scan the products in the second portion of the retail space, wherein the second speed is different from the first speed; and
        control the self-navigating mobile computing device to autonomously move within the retail space at the first speed through the first portion of the retail space and at the second speed through the second portion of the retail space, while scanning, using the scanner, product identifiers of the products in the first portion of the retail space, and product identifiers of the products in the second portion of the retail space.

17. The system of claim 16, wherein the self-navigating mobile computing device comprises a drone aircraft.

18. The system of claim 16, wherein the instructions are executable on the processor to:
    receive a scan of an environment of the retail space to identify a change in a portion of the environment, the portion of the environment after the change comprising products that are different from the portion of the environment prior to the change; and
    in response to identifying the change in the portion of the environment, perform an update scan of the retail space by routing the self-navigating mobile computing device to the portion of the environment, scanning the products in the portion of the environment after the change, and updating a mapping based on the update scan, the mapping being between two-dimensional product locations of respective products and information of the respective products.

19. A non-transitory machine-readable medium comprising instructions which when executed cause a computer to:
    determine a first density of products in a first portion of a retail space;
    determine a second density of products in a second portion of the retail space, wherein the second density is different from the first density;
    based on the first density, set a first speed of a self-navigating mobile computing device having a scanner to scan the products in the first portion of the retail space;
    based on the second density, set a second speed of the self-navigating mobile computing device to scan the products in the second portion of the retail space, wherein the second speed is different from the first speed; and
    control the self-navigating mobile computing device to autonomously move within the retail space at the first speed through the first portion of the retail space and at the second speed through the second portion of the retail space, while scanning, using the scanner, product identifiers of the products in the first portion of the retail space, and product identifiers of the products in the second portion of the retail space.

20. The non-transitory machine-readable medium of claim 19, wherein the instructions when executed cause the computer to:
    receive a scan of an environment of the retail space to identify a change in a portion of the environment, the portion of the environment after the change comprising products that are different from the portion of the environment prior to the change; and
    in response to identifying the change in the portion of the environment, perform an update scan of the retail space by routing the self-navigating mobile computing device to the portion of the environment, scanning the products in the portion of the environment after the change, and updating a mapping based on the update scan, the mapping being between two-dimensional product locations of respective products and information of the respective products.

* * * * *